H. VOLCKMANN.
GRASS HOOK.
APPLICATION FILED NOV. 19, 1909.
1,091,549.
Patented Mar. 31, 1914.
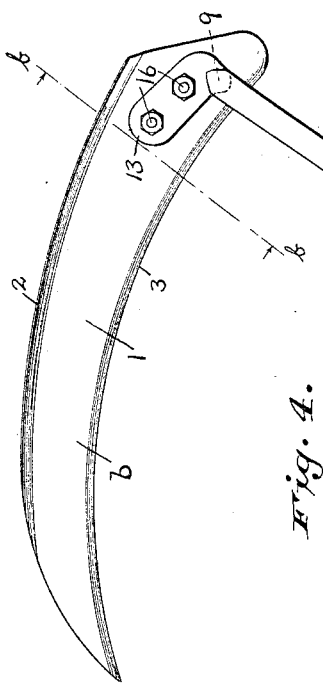
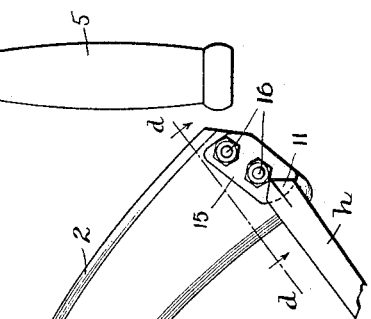
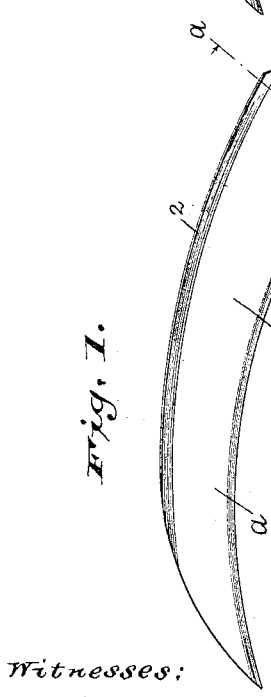
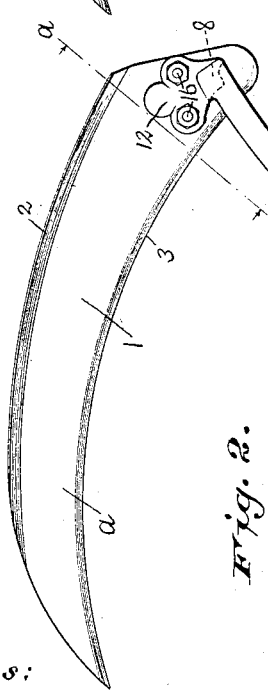
Witnesses:
Tved Palm
Chas. L. Goss.
Inventor:
Hugo Volckmann
By Winkler Flanders Bottum Howitt
Attorneys.

UNITED STATES PATENT OFFICE.

HUGO VOLCKMANN, OF WATERTOWN, WISCONSIN, ASSIGNOR TO WASHINGTON CUTLERY COMPANY, OF WATERTOWN, WISCONSIN, A CORPORATION OF WISCONSIN.

GRASS-HOOK.

1,091,549.  Specification of Letters Patent.  Patented Mar. 31, 1914.

Application filed November 19, 1909. Serial No. 528,905.

*To all whom it may concern:*

Be it known that I, HUGO VOLCKMANN, a citizen of the United States, residing at Watertown, in the county of Jefferson and State of Wisconsin, have invented certain new and useful Improvements in Grass-Hooks, of which the following is a specification, reference being had to the accompanying drawing, forming a part thereof.

This invention relates to grass hooks and the objects of the invention are to improve the construction of grass hooks so that the entire length of the blade can be utilized for cutting and to provide the blade with a handle shank which will not interfere with the grass or material being cut as will be hereafter fully pointed out in the specification and claim.

Referring to the drawings which accompany this specification and form a part thereof, Figure 1 is a plan view of a grass hook embodying this invention; Fig. 2 is a sectional elevation taken on the line *a—a* of Fig. 1, looking in the direction indicated by the arrows, only a part of the handle shank being shown; Fig. 3 is a plan view of another form of grass hook embodying this invention; Fig. 4 is a sectional elevation on the line *b—b* of Fig. 3 looking in the direction indicated by the arrows, only a part of the handle shank being shown; Fig. 5 is a plan view of another form of grass hook embodying this invention, and Fig. 6 is a sectional elevation taken on the line *d—d* of Fig. 5 looking in the direction indicated by the arrows, only a part of the handle shank being shown.

I have illustrated three different forms of grass hooks in order to show how readily this invention can be embodied in grass hooks provided with various kinds of handle shanks and blades, but I do not limit my invention to the particular grass hooks shown.

Grass hooks embodying this invention are characterized by a blade having a free, unobstructed cutting edge and a handle shank provided with a pillar part to offset the handle shank above the blade. The pillar part of the handle shank is secured to the blade back of the sharpened cutting edge and may be secured to the blade in any suitable manner. The pillar part of the handle shank may be made as a separate member but ordinarily it will be cheaper and more convenient to make it as an integral part of the handle shank.

Referring to the drawings the reference letters *a*, *b*, and *d* designate the blades of the grass hooks generally and the reference letters *e*, *f*, and *h* designate the handle shanks generally. The blades may be of any desired or preferred construction as, for example, sheet metal blades, like those shown by the drawings, each of which is composed of a body portion 1, a raised back strengthening and stiffening portion 2, and a cutting edge 3. The handle shanks *e*, *f*, and *h* may be of any desired or preferred construction or shape and are preferably provided with enlarged hand grips 4, 5, and 7 in the customary manner. Preferably the hand grips are positioned with respect to the blades as shown by the drawings, the positions shown giving the proper "hang" to the hooks, as will be apparent to those skilled in the art without further explanation. The pillar parts of the handle shanks *e*, *f*, and *h* are designated by the reference numerals 8, 9, and 11 respectively and the drawings clearly show how these pillar parts offset the handle shanks above the blades, and the drawings also show these pillar parts secured to the blades back of the cutting edges and between the extremities thereof, so that the cutting edges of the blades are free and unobstructed throughout their entire length. These pillar parts may be perpendicular to the blades or be disposed at any suitable angle with the blades and the drawings show them disposed at suitable and convenient angles with the blades.

When the blades are made thin, it is preferred to provide the pillar parts of the handle shanks with feet or attaching parts 12, 13, and 15, which are fastened to the blades by bolts 16 or in any other suitable manner. These feet or attaching parts enable the pillar parts to be rigidly and securely fastened to blades as will be readily understood and they may be fashioned in any form desired fanciful or plain.

What is claimed is:

In a grass hook, the combination of a substantially flat blade, provided with a cutting edge extending substantially the entire length thereof, with a handle shank offset from the plane of the blade and substantially parallel with the plane of the blade, the handle shank being offset from the blade by a pillar part terminating in a flat head which is attached to the blade near one end thereof and between the cutting edge and the back of the blade and between the extremities of the cutting edge of the blade so that the cutting edge of the blade is spaced from the pillar part and its flat head and passes underneath the offset handle shank and is spaced from the same, substantially as described.

In witness whereof I hereto affix my signature in presence of two witnesses.

HUGO VOLCKMANN.

Witnesses:
  E. J. GEITTMAN,
  EDWIN O. STOPS.